(12) United States Patent
Currier

(10) Patent No.: US 10,142,121 B2
(45) Date of Patent: Nov. 27, 2018

(54) PROVIDING SYNCHRONOUS CONTENT AND SUPPLEMENTAL EXPERIENCES

(75) Inventor: Ryan Currier, Berkeley, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 795 days.

(21) Appl. No.: 13/313,531

(22) Filed: Dec. 7, 2011

(65) Prior Publication Data

US 2013/0151728 A1   Jun. 13, 2013

(51) Int. Cl.
| | |
|---|---|
| *G06F 15/16* | (2006.01) |
| *H04L 12/28* | (2006.01) |
| *H04N 21/242* | (2011.01) |
| *H04N 21/43* | (2011.01) |
| *H04N 21/462* | (2011.01) |
| *H04N 21/81* | (2011.01) |
| *H04N 21/236* | (2011.01) |
| *H04N 21/41* | (2011.01) |
| *H04N 21/434* | (2011.01) |
| *H04N 21/4363* | (2011.01) |
| *H04N 21/84* | (2011.01) |

(52) U.S. Cl.
CPC ... *H04L 12/2801* (2013.01); *H04N 21/23614* (2013.01); *H04N 21/242* (2013.01); *H04N 21/4122* (2013.01); *H04N 21/4126* (2013.01); *H04N 21/4307* (2013.01); *H04N 21/4348* (2013.01); *H04N 21/43637* (2013.01); *H04N 21/4622* (2013.01); *H04N 21/8133* (2013.01); *H04N 21/84* (2013.01)

(58) Field of Classification Search
CPC .......... H04L 29/0854; H04L 29/08072; H04L 29/06
USPC ......................................................... 709/248
See application file for complete search history.

(56) References Cited

U.S. PATENT DOCUMENTS

| | | |
|---|---|---|
| 6,240,555 B1 | 5/2001 | Shoff et al. |
| 6,415,438 B1 | 7/2002 | Blackketter et al. |
| 2001/0021995 A1 | 9/2001 | Hatano |
| 2002/0042920 A1 | 4/2002 | Thomas et al. |
| 2002/0116707 A1 | 8/2002 | Morris et al. |
| 2002/0184314 A1* | 12/2002 | Riise ................. H04L 12/1859 709/205 |
| 2002/0194529 A1 | 12/2002 | Doucette et al. |

(Continued)

OTHER PUBLICATIONS

European Search Report—EP 12196066.0—dated Oct. 7, 2013.

(Continued)

*Primary Examiner* — Alan S Chou
(74) *Attorney, Agent, or Firm* — Banner & Witcoff, Ltd.

(57) ABSTRACT

Methods, systems, computer readable media, and apparatuses for providing synchronous supplemental experiences are presented. According to one or more aspects, a video signal may be transmitted to a display device, and a sync signal may be transmitted to at least one other device. The sync signal may include an identifier of a program currently being displayed and a time value indicating a current point in time of the program. In at least one arrangement, the sync signal may cause the at least one other device to access content synchronization data; determine, based on the content synchronization data, that at least one supplemental experience corresponds to the identifier of the program and the time value; and present the at least one supplemental experience to a user.

19 Claims, 5 Drawing Sheets

(56) References Cited

U.S. PATENT DOCUMENTS

| | | |
|---|---|---|
| 2002/0194592 A1 | 12/2002 | Tsuchida et al. |
| 2003/0018966 A1 | 1/2003 | Cook et al. |
| 2003/0079230 A1* | 4/2003 | Woodward, Jr. ........ H04L 47/10 725/90 |
| 2003/0189668 A1 | 10/2003 | Newnam et al. |
| 2004/0015400 A1 | 1/2004 | Whymark |
| 2004/0060068 A1 | 3/2004 | Barbier et al. |
| 2004/0103439 A1 | 5/2004 | Macrae et al. |
| 2004/0117831 A1 | 6/2004 | Ellis et al. |
| 2004/0139472 A1 | 7/2004 | Furet et al. |
| 2004/0139480 A1 | 7/2004 | Delpuch et al. |
| 2004/0226051 A1 | 11/2004 | Carney et al. |
| 2004/0237120 A1 | 11/2004 | Lewin et al. |
| 2005/0028195 A1* | 2/2005 | Feinleib et al. ................. 725/32 |
| 2005/0177861 A1 | 8/2005 | Ma et al. |
| 2006/0031914 A1* | 2/2006 | Dakss et al. .................. 725/135 |
| 2006/0168624 A1 | 7/2006 | Carney et al. |
| 2008/0092164 A1 | 4/2008 | Agarwal et al. |
| 2009/0133070 A1* | 5/2009 | Hamano ............. G06F 21/6218 725/46 |
| 2010/0162343 A1 | 6/2010 | Roberts et al. |
| 2010/0295992 A1 | 11/2010 | Lee et al. |
| 2012/0011550 A1* | 1/2012 | Holland ............. H04N 21/4126 725/78 |

OTHER PUBLICATIONS

European Office Action—EP 12196066.0—Dated Apr. 24, 2015.
Response to European Office Action—EP 12196066.0—Dated Aug. 21, 2015.
Sep. 14, 2018—Canadian Office Action—CA 2,796,692.

* cited by examiner

601

[Video Program: Live Football Game]

602

*Live Football*

Score 603

Dallas 7 – Philadelphia 49
4th Quarter – 8:15 remaining

604

Select your pick for player of the game:
[x] Philadelphia Quarterback A
[_] Philadelphia Wide Receiver A
[_] Philadelphia Wide Receiver B
[_] Dallas Running Back A

605

Click here to switch to a different game.

FIG. 6

PROVIDING SYNCHRONOUS CONTENT AND SUPPLEMENTAL EXPERIENCES

BACKGROUND

Increasingly, many people are coming to own and operate multiple computing devices of various kinds in their homes, workplaces, and other environments. In an example home, a family may have a computing device that receives digital audiovisual content, another computing device that they use primarily for browsing a network such as the Internet and viewing digital data, and still another computing device, such as a laptop computer or a smartphone, that they use for word processing, email communications, playing video games, and so on. This disclosure provides aspects for more convenient, functional, and useable ways of providing synchronized content experiences across multiple computing devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to providing synchronized content experiences across multiple computing devices, and in particular aspects, to providing synchronous supplemental experiences. For instance, according to one or more aspects of the disclosure, a content and/or service provider(s) may be able to provide users with enhanced user experiences that take advantage of the user having additional computing devices in their local area beyond a traditional content receiver device. For example, in addition to having a content receiver device and a display device connected thereto for displaying received video programming, the user also may have a tablet computer or a smartphone that the user might use while simultaneously viewing content that is received by the content receiver device. By implementing one or more aspects of the disclosure, supplemental content related to the video content being received by the content receiver and displayed on the display device, for instance, may be presented on the user's tablet computer, smartphone, etc., and the presentation of this supplemental content may be synchronized with the display of the video content.

According to one or more aspects, a video signal may be transmitted to a display device. Simultaneously, or shortly thereafter, a synchronization signal may be transmitted to at least one local device, and the synchronization signal may include an identifier of a program currently being displayed and a time value indicating a current point in time of the program. In one or more arrangements, the synchronization signal may cause the at least one local device to access a content synchronization map; determine, based on the content synchronization map, that at least one supplemental experience corresponds to the identifier of the program and the time value; and provide access to the at least one supplemental experience.

BRIEF DESCRIPTION OF THE DRAWINGS

The present disclosure is illustrated by way of example and not limited in the accompanying figures in which like reference numerals indicate similar elements and in which:

FIG. 6 illustrates example user interfaces by which a supplemental experience may be provided according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
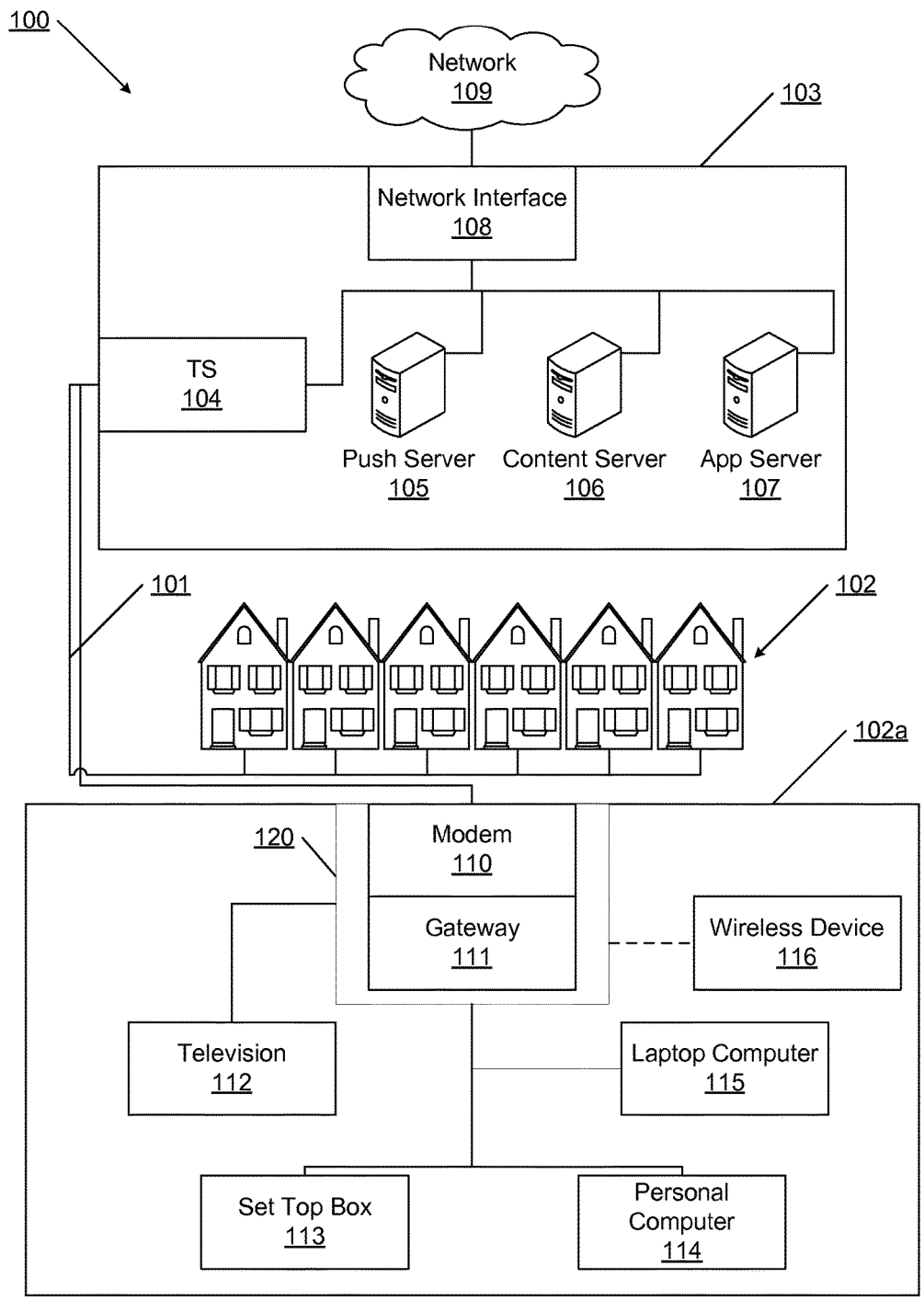
FIG. 1 illustrates an example information distribution network according to one or more aspects described herein.

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links or lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include an interface or termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102.

An example premises 102a, such as a home, may include an interface 120. In one embodiment, the interface may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
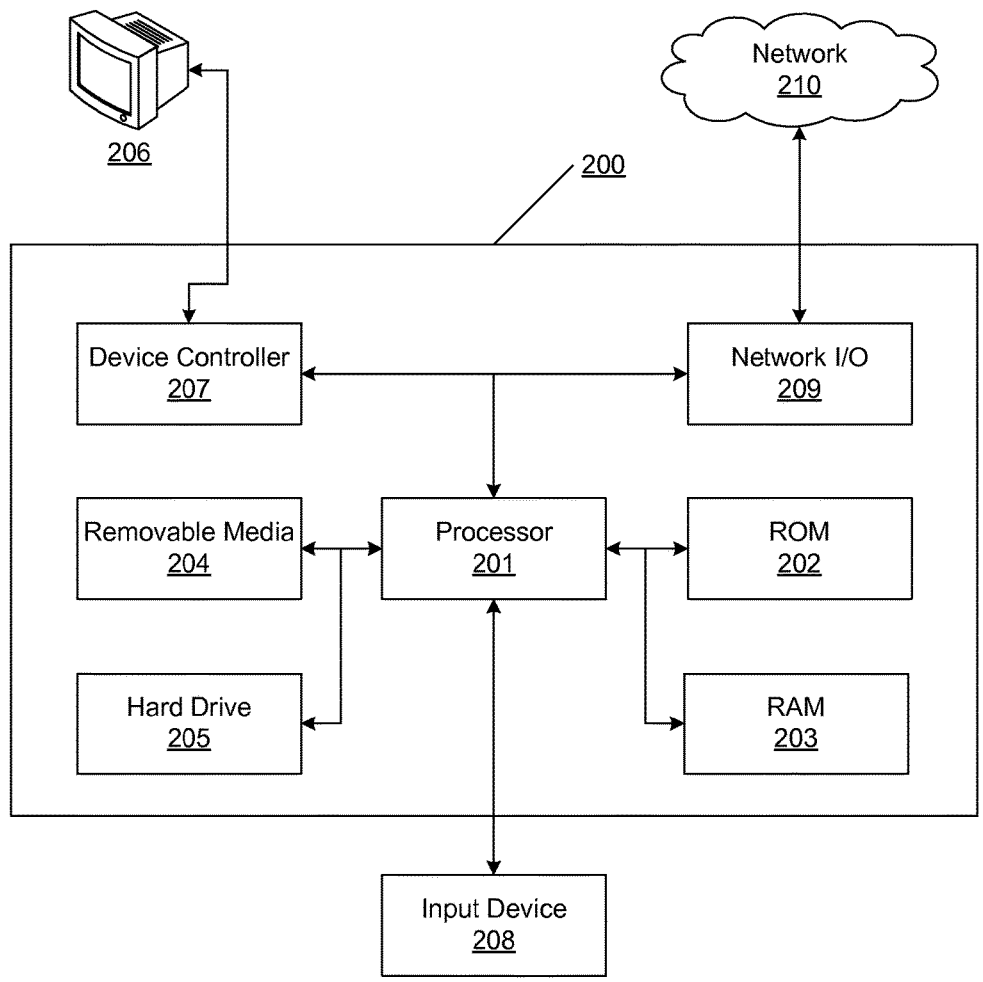
FIG. 2 illustrates an example hardware platform on which the various elements described herein may be implemented according to one or more aspects described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
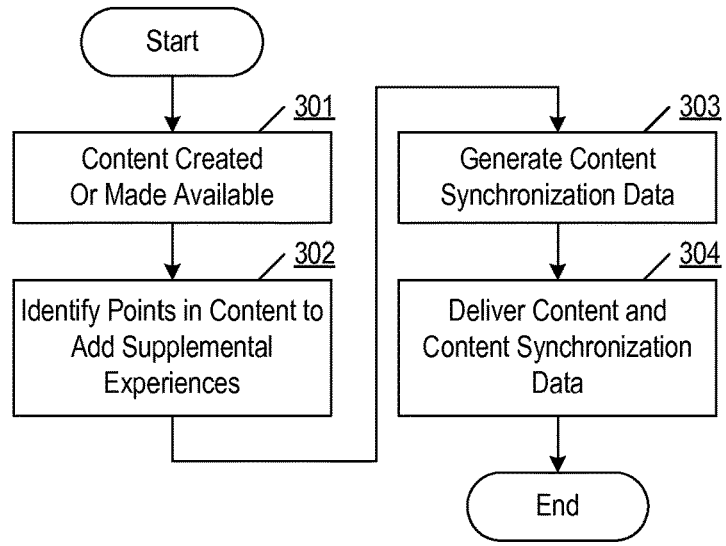
FIG. 3 illustrates an example method of creating content synchronization data according to one or more aspects described herein.
Figure 4:
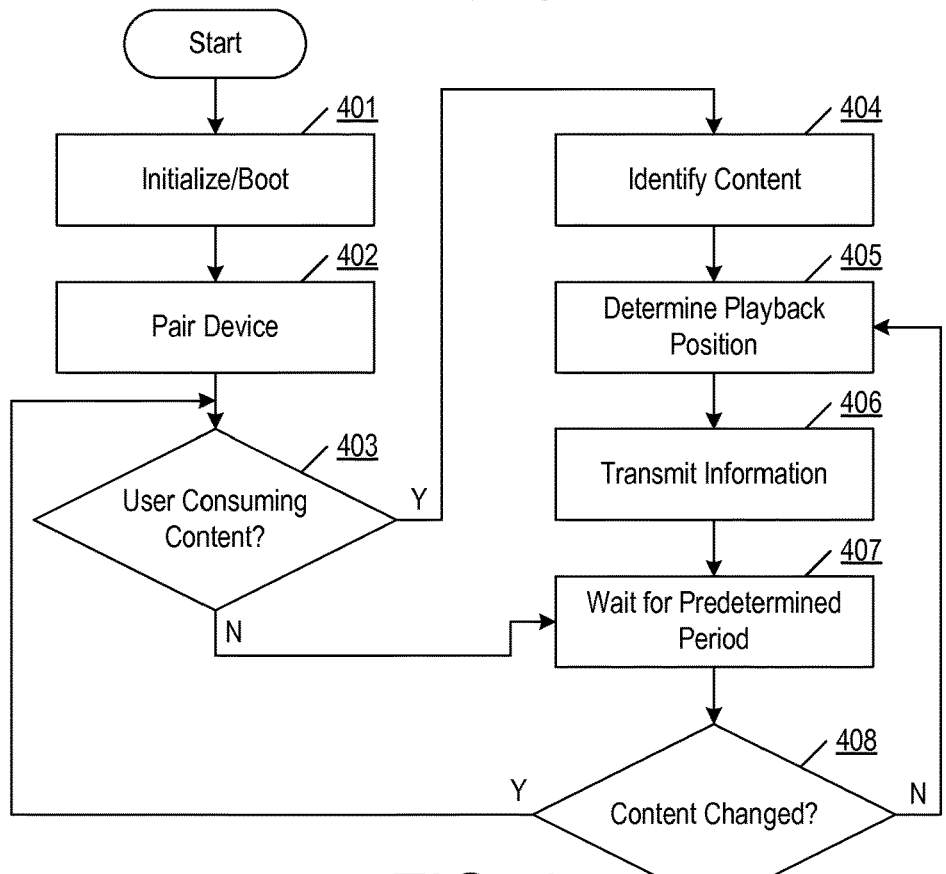
FIG. 4 illustrates an example method of transmitting a synchronization signal according to one or more aspects described herein.
Figure 5:
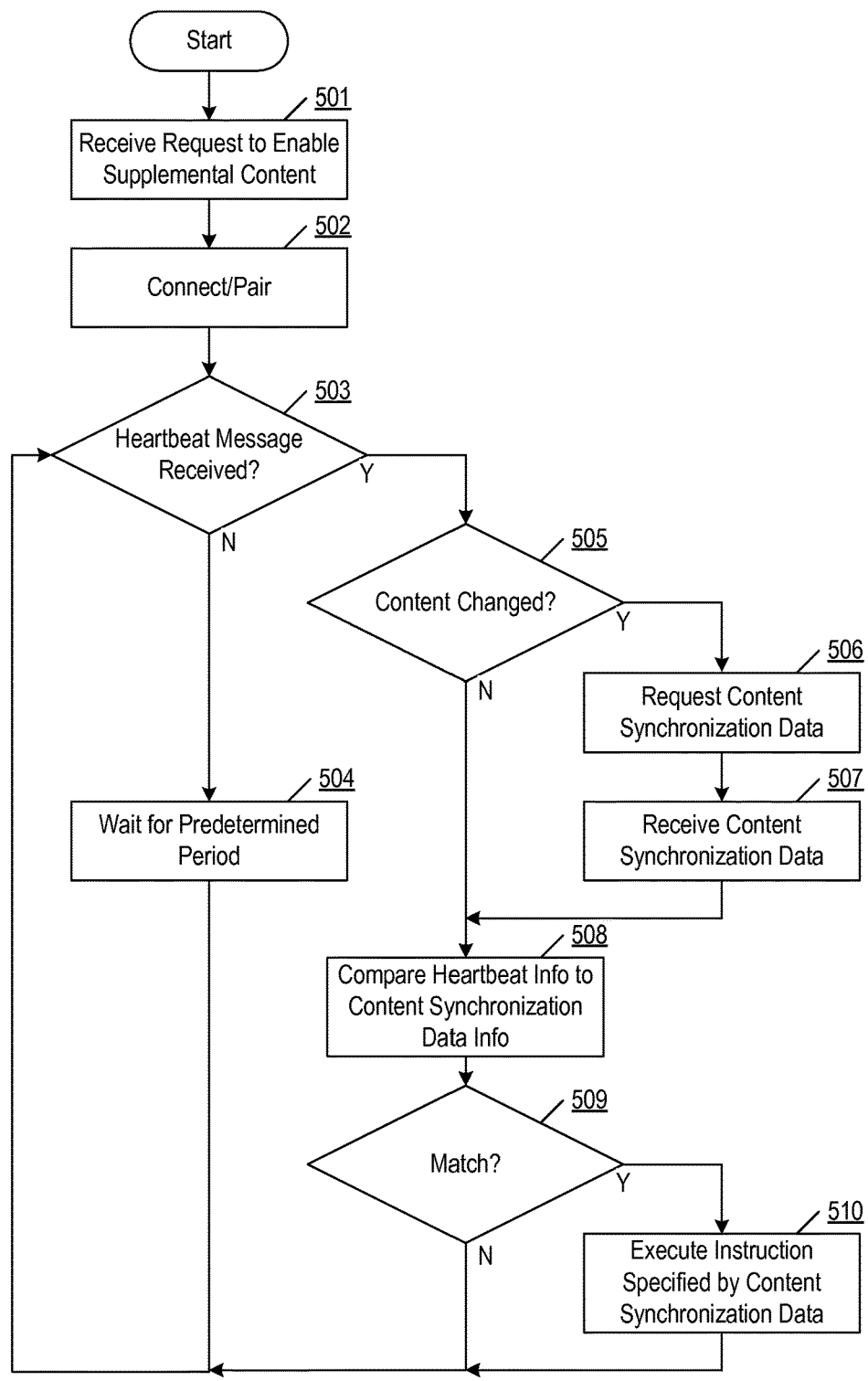
FIG. 5 illustrates an example method of processing a synchronization signal according to one or more aspects described herein.

According to one or more aspects, various entities and/or devices may perform methods (e.g., steps) in providing synchronous supplemental experiences to one or more users (e.g., content viewers). The flowcharts shown in FIGS. 3-5 illustrate some examples of these methods, which are described in greater detail below. As an overview, FIG. 3 illustrates an example method that may be performed by a content creator, for instance, in creating content (e.g., television programming) and in creating one or more corresponding supplemental user experiences. FIG. 4 illustrates an example method that may be performed by a device that receives, decodes, and/or displays such content (e.g., gateway 111, television 112, set top box 113, personal computer 114, etc.), where, for instance, the device communicates with another device on which one or more supplemental experiences are presented. FIG. 5 illustrates an example method that may be performed by a device on which one or more supplemental experiences are presented (e.g., laptop computer 115, wireless device 116, etc.). Each of these example methods will now be individually described.

FIG. 3 illustrates an example method of creating content synchronization data, such as a map, according to one or more aspects described herein. According to one or more aspects, any and/or all of the methods and method steps described herein may be performed by a computing device (e.g., application server 107, gateway 111, personal computer 114, computing device 200, etc.), embodied in computer-executable instructions stored on one or more non-transitory computer-readable media, and/or embodied in computer-readable instructions stored in the memory of an apparatus that includes at least one processor which may execute the instructions.

In step 301, a content creator, provider, or producer may create program content (a network may create content or an individual may upload content to a computing device for sharing, for example). The program content then may be received and/or stored by a computing device (e.g., a personal computer used by the content creator, a server accessible to the content creator, etc.) and/or stored on one or more computer-readable media. For example, a television producer may create (e.g., write, film, edit, etc.) a television program and may store the television program (e.g., the digital video and audio data making up the television program) on a computing device. In another example, a movie producer may create (e.g., write, film, edit, etc.) a movie and may similarly store the movie (e.g., the digital video and audio data making up the movie) on a computing device.

In step 302, the content creator (or another party) may identify points in the program content at which one or more supplemental experiences should be added and/or defined. The content creator's computing device then may store information (e.g., in a data table) indicating which supplemental experience(s) should occur at what point(s) of the program. For example, the stored information may include an Internet Uniform Resource Locator (URL), or the name of a locally-stored computer software routine to be executed. The content creator's computing device also may store additional information about the supplemental experiences (e.g., any related computer-readable instructions, graphics, audio and/or video content, etc.) which may be used by a user device in providing one or more supplemental experiences, as further described below. In some arrangements, the content creator's computing device may automatically identify points in the program content at which one or more supplemental experience should be added and/or defined, for instance, by using video analysis software and/or algorithms (e.g., which may identify points in the program where credits start rolling, a particular actor or actress begins speaking, a commercial break starts or ends, other changes in the audio and/or video feed, etc.).

Supplemental experiences may generally include interactive and/or non-interactive content that is displayed and/or otherwise presented independently of related primary content. Primary content may include, for instance, content such as television programming, movies, data, and so on, that is complemented by the content making up the corresponding supplemental experience. In some arrangements, independently presenting a supplemental experience may include displaying and/or playing the interactive and/or non-interactive content making up the supplemental experience on a device different from the device on which corresponding primary content is displayed and/or presented. For instance, primary content, such as a television show, may be displayed on display 112, while a supplemental experience related to the primary content, such as an interactive trivia game related to the television show, may be displayed, executed, and/or otherwise presented on a viewer's laptop or tablet computer (e.g., laptop computer 115, wireless device 116, etc.). In other arrangements, independently presenting a supplemental experience may include displaying and/or playing the interactive and/or non-interactive content making up the supplemental experience on the same device upon which corresponding primary content is displayed, but in a different screen area (e.g., a dedicated window, an overlay, etc.).

Thus, in step 302, a producer of television programming, for instance, may identify points in the television program at which one or more supplemental experiences should be added and/or defined. Alternatively, such identification may be done by a different party. In many arrangements, the point(s) of the program at which supplemental experience(s) are to be defined may be selected such that these points correspond to the content being displayed and/or otherwise played at that point in time of the program. For example, if the television program is a game show with three rounds (e.g., a first round, a second round, and a final round), a first supplemental experience may be created and defined to begin and coincide with playback of the first round of the game show, a second supplemental experience (which may be different from the first supplemental experience) may be created and defined to begin and coincide with playback of the second round of the game show (and optionally cause playback of the first supplemental experience to end), and a third supplemental experience (which may be different from the first supplemental experience and the second supplemental experience) may be created and defined to begin and coincide with playback of the final round of the game show (and optionally cause playback of the first and/or second supplemental experience to end). In another example, where the program is a feature film or movie, supplemental experiences may be created and defined to begin and coincide with particular events in the plot of the feature film or movie.

Additionally or alternatively, supplemental experiences may be created and defined to begin and coincide with particular playback events, such as fast-forward and/or rewind operations, sound muting operations, and so on. For example, a first supplemental experience (e.g., displaying plot summary, program navigation information, and a first set of advertising content) may be created and defined to begin and coincide with fast-forward operations, while a second supplemental experience (e.g., displaying a transcript of the program's audio content and a second set of advertising content) may be created and defined to begin and coincide with sound muting operations.

Additionally or alternatively, one or more supplemental experiences may be synchronized with primary content such that content associated with a supplemental experience is presented to a viewer at the same time in relation to the primary content regardless of whether the viewer is watching the primary content live or in a time-shifted context. In at least one arrangement, in a time-shifted context, some aspects of the content associated with the supplemental experience may be impacted by actions made by other viewers when the other viewers experienced such content. For example, if multiple viewers (e.g., 100 people) watch a particular program live (e.g., as the particular program is first transmitted, e.g., broadcast, multicast, unicast, etc.), these viewers may interact with a supplemental experience that includes a program-related poll (e.g., by voting) and/or with another supplemental experience that aggregates program-related comments posted by viewers on a message service (e.g., a social networking service, such as TWITTER). As viewers vote or post comments during the timeline of the program, a computing device (e.g., an application server) may, for instance, track and record the times at which particular votes were provided and/or at which particular comments were made. Subsequently, when another viewer begins watching the same program the next day (or in any other time-shifted context), that viewer, when being presented with the supplemental experience, may be presented with (and/or otherwise view) the previously casted votes and/or the previously posted comments at the same time that such votes and/or comments were originally cast and/or made in relation to the program. In this way, viewers watching programming in a time-shifted context may feel as though they are experiencing the supplemental experience in real-time (e.g., synchronized with the live transmission and/or broadcast of the program), even though these viewers may actually be interacting with the content hours, days, or weeks after the primary content was first made available. While poll votes and message board comments are used in describing this example, any kind of user-generated and/or user-submitted content could similarly be captured and later presented to viewers viewing content in a time-shifted context.

Subsequently, in step 303, the content creator's one or more computing devices may generate content synchronization data, such as a map. The content synchronization map may be generated based on the points identified in step 302 at which supplemental experiences are to occur. In addition, the content synchronization map may take the form of a data table in which may be stored the one or more time values at which particular supplemental experience(s) are to be displayed. In some arrangements, the content synchronization map (e.g., the data table) also may store the information making up the supplemental experiences (e.g., video content, audio content, graphical content, interactive content and/or program code for interactive applications, etc.), while in other arrangements, the content synchronization map (e.g., the data table) may store pointers and/or references to the information making up the supplemental experiences (e.g., because such information may be stored in one or more locally stored and/or remotely accessible files). In at least one arrangement, the information making up the supplemental experiences may be centrally stored on one or more web servers, such that this information may be more easily updated and centrally maintained, and one or more devices that display and/or otherwise play back such supplemental experiences may download the information via the Internet. An example map table will be discussed further below in connection with FIG. 5.

In step 304, the content creator's computing device may deliver the program content and the content synchronization map. For example, in step 304, the content creator's computing device may deliver the program content and the content synchronization map by transmitting the program content to a service provider's computing device (e.g., a headend or other computing device at central office 103) and publishing the content synchronization map to a web server (e.g., application server 107). In some arrangements, the content creator may publish the content synchronization map to a web server that they (the content creator) own and/or operate, while in other arrangements, the content creator may publish the content synchronization map to a web server that the service provider owns and operates.

As described in greater detail below, by delivering the program content and the content synchronization map in this way, the content creator may allow one or more users (e.g., content viewers) to view the delivered content and be presented with one or more supplemental experiences, as defined by the content synchronization map, for instance. Having described the method of FIG. 3, which illustrates what a content creator (and/or the content creator's computing device) might do to create content and one or more corresponding supplemental experiences, the method of FIG. 4, which illustrates what a content receiver (e.g., a user device, such as a gateway 111 provided to a user by a service provider) might do in receiving such content, will now be described.

FIG. 4 illustrates an example method of transmitting a synchronization signal according to one or more aspects described herein. According to one or more aspects, the method illustrated in FIG. 4 may be performed by a device that receives, decodes, and/or displays content to a user (e.g., a computing device, gateway 111, display device 112, set top box 113, personal computer 114, a smartphone, etc.). The device may be located at a provider location or a user location, such as premises 102*a*, and, as further described below, the device may communicate with another device at the user location on which one or more supplemental experiences are presented.

In step 401, a terminal such as a content receiver device may, if needed, initialize and boot up, e.g., by loading into memory operating system software and/or other programs that allow the device to perform various functions, such as those described below.

In step 402, the content receiver device may pair with another device, such as a user's mobile device on which one or more supplemental experiences are to be presented. The user's mobile device may be, for instance, a smart phone (e.g., an APPLE iPhone), a laptop computer, a computing tablet (e.g., an APPLE iPad), and/or the like. According to one or more aspects, pairing the content receiver with the user's mobile device may involve establishing a data connection between the two devices via a local network, such as a wireless local area network (WLAN) at the user location, and/or via other connection mechanisms, such as via a BLUETOOTH connection. In other arrangements, such a data connection may be established over a wide area network, such as the internet, and/or may leverage two-way data communications over cable infrastructure. In still other arrangements, the user's mobile device may be paired with the content receiver by way of an audio synchronization signal emitted by the content receiver (e.g., at a particular frequency) and received by the user's mobile device (e.g., via a microphone included in the device). Although the word "pair" is used here to describe the connection between the content receiver device and the user's mobile device, it should be understood that the content receiver device may simultaneously be paired to a plurality of user devices.

In some arrangements, pairing may be done anonymously, such that a user might not need to create an account, login, or any other sort of identity in order to pair the user's mobile device with the content receiver. In other arrangements, pairing may leverage new or existing user accounts, such as one or more accounts the user may maintain with one or more social networks (e.g., FACEBOOK, TWITTER, etc.) and/or any other services.

Once the content receiver device (or another type of device) has paired with the user's mobile device, for instance, in step 403, the content receiver device may determine whether the user is currently playing, viewing, or otherwise consuming a program. For example, in step 403, the content receiver device may determine whether it is displaying, or causing to be displayed, content (e.g., audiovisual content, such as linear or on-demand video programming) to the user (as opposed to displaying a full-screen menu that does not include any audiovisual programming content, for instance).

Subsequently, if the content receiver device determines, in step 403, that the user is currently consuming content, such as a program, then in step 404, the content receiver device may identify the program being played. In identifying the program being played, the content receiver device may, for example, extract and store information about the program from headers of data packets that include the audiovisual data of the program and that are received by the content receiver device, and/or the content receiver device may access, retrieve, and store information about the program from one or more data tables, such as data tables included in a database stored on the service provider's server (e.g., content server 106, application server 107, etc.). The program information stored by the content receiver device in this step may include the title of the program, the genre of the program, a unique identifier (e.g., identification number or string of alphanumeric characters) corresponding to the program, the length of the program (e.g., in number of frames, units of time, and/or any other desired units), a channel number corresponding to the channel on which the program is being received (if the program is being received on a particular channel), the name of the channel on which the program is being received (again, if the program is being received on a particular channel), and/or a current playback position of the program (e.g., in number of frames, units of time, and/or any other desired units). According to one or more aspects, the current playback position may indicate how much of the program has elapsed as of the current time. For instance, the current playback position may be expressed as frame number 27,456 of 54,000, or 50.84% elapsed, or 915.2 seconds elapsed. According to one or more additional aspects, the current playback position may include, instead of or in addition to a current timestamp, a unique marker or trigger (e.g., point A, point B, point C, etc.) that indicates a position in the timeline of the program.

In addition to identifying information about the program, the content receiver may also gather information about device capabilities (e.g., functions that the content receiver is capable of, such as whether the content receiver includes a digital video recorder (DVR) function and/or whether the content receiver can receive and display high definition (HD) content, etc.) and/or user account information (e.g., subscriber information, such as what channels and/or packages the user might receive, what channels the user has access to, what other content the user may be entitled to view, what other services the user might receive through the service provider, such as digital voice and/or telephone services, etc.). Any and/or all of this information may, for instance, subsequently be transmitted to the user's mobile device, as further described below, and may inform aspects of one or more supplemental experiences displayed on the user's mobile device. For example, if a particular viewer also receives digital voice and/or telephone services, a supplemental experience displayed during an advertisement might include a button allowing a user to be directly connected to a representative of a company corresponding to the advertisement, so as to enable the viewer to purchase the company's goods and/or services being advertised. Additionally or alternatively, transmission of this information may be controlled based on business rules, such as business arrangements between, for instance, the content provider/distributor and the content creator which developed a particular supplemental experience.

After identifying the program currently being played in step 404, the content receiver device may, in step 405, determine the current playback position of the program. In one or more arrangements, the content receiver device may determine the current playback position of the program by referencing the program information identified in step 404, because as noted above, such program information may include information specifying the current playback position of the program. In one or more alternative arrangements, however, the content receiver device may determine the current playback position of the program based on the scheduled start time of the program (e.g., as indicated by and/or included in the program information identified in step 404) and the current time. For instance, the content receiver device may subtract the scheduled start time of the program from the current time to obtain the amount of time that has elapsed in the program, and this elapsed time may represent the current playback position.

Subsequently, in step 406, the content receiver device may transmit information to the user's mobile device (and/or to any other device that was paired with the content receiver device in step 402). The information transmitted to the paired device (e.g., the user's mobile device) in this step may include current information about the program currently being played on and/or by the content receiver device, such as the unique identifier of the program, the current playback position, and/or the like. Additionally or alternatively, the information transmitted to the paired device may include state information about the content receiver device, such as the current sound volume level, the current playback speed, the current subtitle and/or caption settings, the current user permission level (e.g., specifying whether the user is allowed to access content of all rating levels or limited rating levels based on current parental control settings), and/or the like.

According to one or more aspects, the information transmitted in step 406 may be sent as a data message to the user's mobile device. In addition, this message may constitute a "heartbeat" message, because the content receiver device may transmit such a message to the user's mobile device at a regular interval (e.g., every three seconds or at any other desired interval), as further described below.

In step 407, the content receiver device may wait for a predetermined period of time. For example, the content receiver device may wait for an amount of time (e.g., fifty milliseconds, one or two seconds, etc.) before performing any further steps of the method illustrated in FIG. 4. The content receiver device may perform other actions during this time, however, such as continuing to receive, decode, and display audiovisual content. By waiting for this predetermined period of time, the content receiver device may create the interval between heartbeat messages sent by the content receiver device to the paired device. In addition, by increasing or decreasing the predetermined amount of time that the content receiver device waits in step 407, the frequency at which the content receiver device sends such heartbeat messages to the paired device may be correspondingly decreased or increased.

After the content receiver device has waited for the predetermined period of time in step 407, the content receiver device may, in step 408, determine whether the same program is still being played as when the previous heartbeat message was sent in step 406.

If the content receiver device determined, in step 408, that the same program is still being played, then the content receiver device's execution of the method may return to step 405, where the content receiver device may determine the updated playback position of the program and subsequently transmit to the paired device another heartbeat message that includes updated playback position information. On the other hand, if the content receiver device determines, in step 408, that the program being played has changed since the previous heartbeat message was sent, then the content receiver device's execution of the method may return to step 403, where the content receiver device may determine whether the user is currently playing a program.

By transmitting a synchronization signal, such as a heartbeat message, to a paired device in this way, the content receiver device may enable the paired device (e.g., the user's mobile device) to know what program is currently being displayed and what part of the program is currently being displayed by the content receiver device, among other things. As described below, this information may allow the paired to device to present one or more supplemental experiences that may correspond to particular points in the program. Having thus described the method of FIG. 4, which illustrates what a content receiver device might do to transmit a synchronization signal, the method of FIG. 5, which illustrates what a paired device, such as a user's mobile device, might do when receiving such a synchronization signal, will now be described.

FIG. 5 illustrates an example method of processing a synchronization signal according to one or more aspects described herein. According to one or more aspects, the method illustrated in FIG. 5 may be performed by a device that is paired to the content receiver device in the previous method, such as a mobile device at the user's location that is used by the user (e.g., laptop computer 115, wireless device 116, etc.). In some embodiments, the method of FIG. 5 may be performed by the content receiver device itself or any other associated device that provides an additional user interface (e.g., a dedicated screen or overlay in addition to the primary display/screen) for presenting a supplemental experience. For clarity, however, the steps of FIG. 5 are described with regards to an example embodiment in which a mobile device is used.

In step 501, the user's mobile device may receive a request to enable presentation of supplemental content. Such a request may be received, for instance, as user input provided via a user preferences or settings menu presented by the device. Additionally or alternatively, such a request may correspond to the user launching a particular software application or performing another action on the mobile device. The software application may be developed and made available to the user by the service provider and further may include program code that, when executed, causes the user's mobile device to perform any and/or all of the steps of the method illustrated in FIG. 5.

In step 502, the user's mobile device may connect to and/or be paired with another device, such as the content receiver device. For example, in step 502, the user's mobile device may establish a data connection with the content receiver device, as described above with respect to step 402 of the method of FIG. 4. In one or more arrangements, in addition to receiving information from the content receiver device, such as one or more heartbeat messages, the user's mobile device also may transmit information to the content receiver device. For example, as one or more supplemental experiences are presented on the user's mobile device based on the one or more heartbeat messages sent to the user's mobile device by the content receiver device, as further described below, the user's mobile device may periodically send its own synchronization signal back to the content receiver device (e.g., a reverse synchronization signal) indicating, for instance, what supplemental experience(s) is currently being presented. Such a reverse synchronization signal may, for instance, trigger changes on the primary screen (e.g., as displayed by or caused to be displayed by the content receiver device). For example, the reverse synchronization signal may be used to cause the content receiver device to change channels, launch an on demand content interface, load menus and/or applications, schedule and/or play recordings, and/or change user settings. Additionally or alternatively, the reverse synchronization could be used in controlling on-demand or previously recorded content where the content being displayed on the primary screen is impacted by viewer interactions with the supplemental experience. For instance, if a supplemental experience includes a trivia game, then correct answers to questions in the trivia game might cause one overlay (e.g., "Good job! You answered correctly!") to be displayed on the primary screen, while incorrect answers to questions in the trivia game might cause a different overlay (e.g., "Sorry, try again!") to be displayed on the primary screen. In another example, if a supplemental experience includes a fantasy sports game, then scoring updates in the fantasy sports game may cause notifications to be displayed as overlays on the primary screen (e.g., "Score Update: Player AAA on Team BBB just scored a touchdown and gained you 7 points! Your current score is now 44 points!").

Referring again to FIG. 5, in step 503, it may be determined whether a heartbeat message has been received, e.g., by the user's mobile device from the content receiver device. For example, in step 503, the user's mobile device may determine whether it has received a heartbeat message from the content receiver device via the data connection established in step 502. As described in greater detail above, the heartbeat message may be a synchronization signal that includes information about a program currently being received, decoded, and/or displayed (or caused to be displayed) by the content receiver device.

If it is determined, in step 503, that a heartbeat message has not been received, then in step 504, the user's mobile device may wait for a predetermined period of time, and then the method may return to step 503 where it again may be determined whether a heartbeat message has been received. For example, if no heartbeat message has yet been received, then the user's mobile device may wait for a short period of time (e.g., one second, five seconds, etc.) and then may re-determine whether a heartbeat message has been received. This loop may continue until a heartbeat message is received, or alternatively, until the software application is exited and/or the user's mobile device is powered off.

If, on the other hand, it is determined in step 503 that a heartbeat message has been received, then in step 505, the user's computing device may determine whether the heartbeat message indicates that a new or different program is now being displayed by the content receiver device. In determining whether the heartbeat message indicates that a new or different program is being displayed by the content receiver device, the user's mobile device may compare the program identifier and/or program title (or any other desired data) included in the heartbeat message with corresponding information from a previously received heartbeat message to determine whether the program has changed. Additionally or alternatively, if the heartbeat message is the first heartbeat message received by the user's mobile device (e.g., because the device was just powered on, the software application was just launched, etc.), then the user's mobile device might not have information from a previous heartbeat message to compare the current heartbeat message to and thus may determine that the heartbeat message indicates that a new or different program is being displayed.

If it is determined, in step 505, that the heartbeat message indicates that a new or different program is now being displayed on the content receiver device, then in step 506, the user's mobile device may request new content synchronization data (e.g., a content synchronization map, similar to one generated in step 303 above) corresponding to the new or different program. On the other hand, if the program has not changed and the user's mobile device has already loaded the content synchronization data for the current program, then execution of the method may proceed directly to step 508, which is further described below.

According to one or more aspects, content synchronization data may be stored on a remote server (e.g., a web server), and the content synchronization data may be updated by a content creator (as described above, for instance) to include information about one or more supplemental experiences corresponding to one or more particular programs. Also, a different entity (e.g., a content provider, content creator, etc.) than the entity which creates or provides the content (e.g., program) may create or provide the content synchronization data corresponding to that content. Further, multiple content providers or content creators may each provide or create portions of the content and/or portions of the content synchronization data. For example, the content synchronization data stored on a remote server may be created and maintained by multiple different entities. Moreover, in another example, one entity may create one supplemental experience for specific content, while another entity may create another supplemental experience for the same specific content.

In one or more arrangements, content synchronization data may be a data table in which information identifying one or more supplemental experiences are stored in relation to one or more portions of a program and/or events. The following table illustrates an example of content synchronization data:

| Program Time | Event | Supplemental Experience(s) | Data Source |
| --- | --- | --- | --- |
| Time: 00:18:02.24-00:26:16.01 | Play | Application A - Trivia Game | http://www.example1.com/data1/ |
| Time: 00:42:12.29-00:60:00.30 | Play | Application B - Shopping Application | http://www.example2.com/data2/ |
| N/A | Mute | Application C - Plot Summary Display | http://www.example3.com/data3/ |

By performing the remaining steps of the method of FIG. 5, which are further described below, using the example content synchronization data illustrated in the table above, for instance, the user's mobile device thus may present "Application A—Trivia Game" as a supplemental experience during the corresponding times of the program indicated in the table (e.g., while the heartbeat message(s) indicate the playback position is within the time period indicated in the table). In addition, prior to and/or while presenting this supplemental experience, the user's mobile device may access, retrieve, and/or store information defining the supplemental experience from the corresponding data source designated in the content synchronization data (e.g., http://www.example1.com/data1/). Similarly, the user's computing device may present "Application B—Shopping Application" as a supplemental experience during the corresponding times indicated in the table corresponding that supplemental experience (e.g., as based on the playback position of the program indicated in the heartbeat message(s)), and may access, retrieve, and/or store information from the corresponding data source (e.g., http://www.example2.com/data2/). Additionally or alternatively, when the heartbeat message indicates that the user has muted the sound on the content receiver device, for instance, the user's mobile device may present "Application C—Plot Summary Display" as a supplemental experience, and may access, retrieve, and/or store information from the corresponding data source indicated in the content synchronization data (e.g., http://www.example3.com/data3/).

Other supplemental experiences may similarly be caused to be displayed. For example, when the heartbeat message indicates that the user has muted the sound on the content receiver device, other types of supplemental experiences, such as closed-captioning and/or translation applications may similarly be executed and/or displayed. In another example, during a fast-forward or rewind operation, a supplemental experience may cause advertisements to be displayed on the user's mobile device, where such advertisements reflect and/or otherwise correspond to advertisements that were skipped in the program content via the fast-forward or rewind operation. Additionally or alternatively, during a fast-forward or rewind operation, a supplemental experience may display "catch-up" information, such as program summaries, show outlines, and/or the like.

Referring again to FIG. 5, after requesting the content synchronization data in step 506, the user's mobile device may receive the requested content synchronization data in step 507. As discussed above, the content synchronization data may be a data table in which one or more supplemental experiences are defined with respect to one or more time periods and/or events associated with playback of the corresponding program.

According to one or more aspects, different content synchronization data may be provided to different users with respect to the same programming content, such that even if two users, each with their own user device, were viewing the same program in the same location and receiving the same heartbeat message from the same content receiver device, the two users' devices might present different supplemental experiences. In some arrangements, different content synchronization data may be provided based on capabilities of the user's device, and this may result in users who are viewing the same program receiving different content synchronization data. For example, one user may be using a laptop computer and thus may receive first content synchronization data that defines a first supplemental experience that is optimized for presentation on the laptop computer, while a second user may be using a touchscreen tablet and thus may receive second content synchronization data that defines a second supplemental experience that is optimized for presentation on the touchscreen tablet (e.g., because it includes content that is designed to be interacted with via touch-based user input). In other arrangements, different content synchronization data may be provided to different users based on user profile information stored on the different user devices and/or maintained by the service provider. For example, such user profile information may include information about the age of each user, and different content synchronization data (and corresponding supplemental experiences) may be provided to users of different ages. As noted above, even though different viewers may be watching the same programming at different points in time, the viewer's perception of the supplemental experiences (including the viewer's perception of user-generated and/or user-submitted content associated with supplemental experiences, such as votes cast in a poll, comments posted to a message service, etc.) may be synchronized with playback of the programming.

In step 508, the user's mobile device may compare information from the most recent heartbeat message to information in the content synchronization data, and in step 509, the user's mobile device may determine whether any of the conditions defined in the content synchronization data match current playback conditions of the program, as indicated by the information from the heartbeat message. For example, the user's mobile device may determine whether the heartbeat message indicates that the program's playback position is within a time period for which, according to the content synchronization data, a particular supplemental experience is to be displayed. Additionally or alternatively, the user's mobile device may determine whether the heartbeat message indicates that a particular event has occurred and/or that the device is in a particular state (e.g., sound volume muted) for which, according to the content synchronization data, a particular supplemental experience is to be displayed.

Subsequently, if it is determined, in step 508, based on the information from the heartbeat message, that one or more conditions defined in the content synchronization data match one or more current playback conditions, then the supplemental experiences corresponding to those matching conditions may be presented, e.g., by executing instructions specified by the content synchronization data. Considering the example content synchronization data in the table above, for instance, if the heartbeat message were to indicate that the sound volume has been muted, then the user's mobile device may execute instructions specified by the content synchronization data by loading the "Application C" supplemental experience from the data source indicated in the table (e.g., http://www.example3.com/data3/). While the example content synchronization data illustrated above includes references in the form of uniform resource locators (URLs) to data sources other than the content synchronization data in which corresponding supplemental experiences are defined, the program code for providing one or more supplemental experiences may, in some arrangements, be stored in the content synchronization data itself.

Having presented the supplemental experience and/or executed the instruction specified by the content synchronization data, or if it is determined that the current playback information does not match any conditions defined by the content synchronization data, the method may return to step 503, and the user's mobile device again may determine whether a heartbeat message has been received. The method then may continue in a loop, with the user's mobile device determining whether new or different programs are being played and/or whether one or more conditions of content synchronization data are met by playback information specified in continuously received heartbeat messages, until, for instance, the user's mobile device is powered off and/or the software application is exited.

FIG. 6 illustrates example user interfaces by which a synchronous supplemental experience may be provided according to one or more aspects described herein. For example, user interface 601 may include video programming, such as a live football game, and may be displayed (or caused to be displayed) by a content receiver device. User interface 602 may be displayed by a device paired to the content receiver device (e.g., the user's mobile device) and may represent a supplemental experience which corresponds to content being displayed by the content receiver device. In the illustration in FIG. 6, for example, user interface 602 shows an example of an interactive polling application. In addition to including dynamically updated content 603 related to the video program (e.g., the score of the football game being displayed at the content receiver device via user interface 601), the interactive polling application of user interface 602 may include interactive controls 604 and 605 that may allow the user to provide user input (in this case, in the form of a vote) that may sent back to a server at the service provider's central office 103 (e.g., application server 107) for additional processing, and that further may allow the user to provide user input to change the content being received and/or displayed by the content receiver device.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:

receiving, by a first user device, via a first wireless protocol, and from a content consumption device, a synchronization signal for a first program being presented by the content consumption device, wherein the synchronization signal comprises information corresponding to the first program;

sending, by the first user device, via a second wireless protocol, and to a computing device, a request for content synchronization data for the first program;

receiving, by the first user device, via the second wireless protocol, and from the computing device, the content synchronization data for the first program;

providing, by the first user device and based on the content synchronization data, at least one supplemental user experience in synchronization with the first program being presented by the content consumption device;

receiving, by the first user device, a user input associated with the at least one supplemental user experience;

after the receiving the user input, transmitting, by the first user device, via the first wireless protocol, and to the content consumption device, a reverse synchronization signal comprising:
  an identifier of the at least one supplemental user experience, and
  information corresponding to the user input; and causing, by the first user device and based on the information corresponding to the user input, the content consumption device to display a second program that is synchronized with the at least one supplemental user experience being presented by the first user device.

2. The method of claim 1, further comprising:
transmitting, to at least one additional user device remote from the first user device, the synchronization signal.

3. The method of claim 1, wherein the receiving the synchronization signal further comprises receiving a heartbeat message indicative of at least one of:
  a channel identifier indicating a channel currently being displayed by the content consumption device,
  a speed identifier indicating a current playback speed,
  a permission identifier indicating a current user permission level, or a volume identifier indicating a current playback volume level.

4. The method of claim 1, further comprising:
determining, by the first user device and based on a second synchronization signal, that the second program has ended and a third program is currently being presented;
accessing, by the first user device and via the second wireless protocol, second content synchronization data for the third program;
determining, by the first user device and based on the second content synchronization data, that a second supplemental user experience is related to the third program; and
providing, by the first user device, the second supplemental user experience in synchronization with the third program currently being presented by the content consumption device.

5. The method of claim 1, further comprising:
determining that the at least one supplemental user experience is customized for a user of the first user device; and
presenting the at least one supplemental user experience based on a usage of the first user device.

6. The method of claim 1, further comprising:
transmitting, via the first wireless protocol and to the content consumption device, a second reverse synchronization signal; and
causing the content consumption device to present previously recorded content based on the second reverse synchronization signal.

7. The method of claim 1, wherein the reverse synchronization signal further comprises a request for on-demand content, and wherein the causing the content consumption device to display the second program is in response to the request for the on-demand content.

8. The method of claim 1, wherein the reverse synchronization signal further comprises a channel change request, and wherein the causing the content consumption device to display the second program is in response to the channel change request.

9. The method of claim 1, further comprising:
after the receiving the user input, sending, by the first user device, via the second wireless protocol, and to the computing device, the information corresponding to the user input.

10. An apparatus comprising:
one or more processors; and
non-transitory memory storing computer-readable instructions that, when executed by the one or more processors, cause the apparatus to:
transmit, to a first user device local to the apparatus and via a first wireless protocol, a synchronization signal comprising:
an identifier of a first content item being presented by the apparatus, and
a time value indicating a current point in a timeline of the first content item;
receive, via the first wireless protocol and from the first user device, a reverse synchronization signal comprising an identifier of at least one supplemental user experience being provided by the first user device in synchronization with the first content item;
determine, based on the identifier in the reverse synchronization signal, that the at least one supplemental user experience is configured for synchronized presentation with a second content item; and
present, in synchronization with the at least one supplemental user experience being provided by the first user device, the second content item.

11. The apparatus of claim 10, wherein the synchronization signal is a heartbeat message, comprising at least one of:
a channel identifier indicating a channel currently being displayed,
a speed identifier indicating a current playback speed,
a permission identifier indicating a current user permission level, or
a volume identifier indicating a current playback volume level.

12. The apparatus of claim 10, wherein the non-transitory memory stores additional computer-readable instructions that, when executed by the one or more processors, further cause the apparatus to:
access second content synchronization data; and
transmit, based on the second content synchronization data, a second synchronization signal for the second content item to the first user device and at least one additional user device.

13. The apparatus of claim 10, wherein the non-transitory memory stores additional computer-readable instructions that, when executed by the one or more processors, further cause the apparatus to:
receive notifications corresponding to the at least one supplemental user experience; and
cause display of the received notifications.

14. The apparatus of claim 10, wherein the non-transitory memory stores additional computer-readable instructions that, when executed by the one or more processors, further cause the apparatus to:
determine that the at least one supplemental user experience is associated with the second content item based on the identifier in the reverse synchronization signal indicating a channel change, wherein the first content item corresponds to a first channel and the second content item corresponds to a second channel.

15. A method comprising:
transmitting, by a user device, via a first wireless protocol, and to a computing device, a request for content synchronization data associated with a first program being presented by a content consumption device;
receiving, from the computing device and via the first wireless protocol, the content synchronization data associated with the first program;
determining, based on the content synchronization data and based on a current timeline of the first program, a supplemental user experience associated with the first program;
presenting the supplemental user experience in synchronization with the first program being presented by the content consumption device;
sending, to the content consumption device and via a second wireless protocol, a reverse synchronization signal, the reverse synchronization signal comprising an identifier of at least one additional supplemental user experience being presented by the user device and an indication to change the first program being presented by the content consumption device; and
causing, based on the identifier in the reverse synchronization signal and the indication to change the first program, the content consumption device to present a second program in synchronization with the at least one additional supplemental user experience being presented by the user device.

16. The method of claim 15, further comprising:
prior to the receiving the content synchronization data associated with the first program, transmitting, by the user device, user information to the computing device, wherein the received content synchronization data is selected based on the user information.

17. The method of claim 15, further comprising:
receiving, from the content consumption device, via the second wireless protocol, and at regular intervals, a synchronization signal indicative of the first program being presented by the content consumption device, wherein the synchronization signal is a heartbeat message comprising at least one of:
a channel identifier indicating a channel currently being displayed,
a speed identifier indicating a current playback speed,
a permission identifier indicating a current user permission level, or
a volume identifier indicating a current playback volume level.

18. The method of claim 15,
wherein the second program corresponds to on-demand content, further comprising:
transmitting, via the first wireless protocol and to the computing device, a second request containing information indicating the on-demand content;
receiving, via the first wireless protocol and from the computing device, second content synchronization data for the on-demand content indicative of a second supplemental user experience; and
presenting, based on the second content synchronization data, the second supplemental user experience in synchronization with the on-demand content being presented by the content consumption device.

19. The method of claim 15, further comprising:
transmitting, to the computing device, the identifier of the at least one additional supplemental user experience; and
receiving, from the computing device, information for the second program.

* * * * *